(12) United States Patent
Evers

(10) Patent No.: US 9,495,698 B2
(45) Date of Patent: Nov. 15, 2016

(54) CONTINUUM-BASED SELECTION OF PRODUCT CHOICE

(76) Inventor: Theodore Michael Evers, Washington, DC (US)

(*) Notice: Subject to any disclaimer, the term of this patent is extended or adjusted under 35 U.S.C. 154(b) by 0 days.

(21) Appl. No.: 13/486,453

(22) Filed: Jun. 1, 2012

(65) Prior Publication Data

US 2012/0311495 A1    Dec. 6, 2012

Related U.S. Application Data

(60) Provisional application No. 61/491,998, filed on Jun. 1, 2011.

(51) Int. Cl.

| | | |
|---|---|---|
| *G06F 3/0482* | (2013.01) | |
| *G06Q 30/06* | (2012.01) | |
| *G06F 3/0484* | (2013.01) | |
| *G06F 3/0481* | (2013.01) | |
| *G06F 3/0485* | (2013.01) | |

(52) U.S. Cl.
CPC ......... *G06Q 30/0603* (2013.01); *G06F 3/0482* (2013.01); *G06Q 30/0631* (2013.01); *G06Q 30/0641* (2013.01); *G06F 3/0481* (2013.01); *G06F 3/0484* (2013.01); *G06F 3/04855* (2013.01)

(58) Field of Classification Search
USPC .......................................... 715/810, 811, 833
See application file for complete search history.

(56) References Cited

U.S. PATENT DOCUMENTS

| | | | |
|---|---|---|---|
| 7,092,892 B1 | 8/2006 | Sobalvarro | |
| 7,136,821 B1 | 11/2006 | Kohavi | |
| 7,305,356 B2 | 12/2007 | Rodon | |
| 7,395,220 B2 | 7/2008 | Abrams | |
| 7,698,062 B1 | 4/2010 | McMullen | |
| 7,761,345 B1* | 7/2010 | Martin et al. | 705/26.1 |
| 2003/0036930 A1 | 2/2003 | Matos | |
| 2004/0210491 A1* | 10/2004 | Sadri | 705/26 |
| 2005/0171940 A1* | 8/2005 | Fogg | G06F 17/30554 |
| 2005/0234897 A1 | 10/2005 | Cheng | |
| 2006/0265361 A1 | 11/2006 | Chu | |
| 2006/0271277 A1 | 11/2006 | Hu | |
| 2007/0033110 A1 | 2/2007 | Philipp | |

(Continued)

OTHER PUBLICATIONS

Bing Xu et al., A Personalized Assistant in 3D Virtual Shopping Environment, Aug. 26, 2010, Intelligent Human-Machine Systems and Cybernetics, pp. 266-269.*

(Continued)

*Primary Examiner* — Linh K Pham
*Assistant Examiner* — Tam Tran
(74) *Attorney, Agent, or Firm* — Attentive Law Group, PLLC

(57) ABSTRACT

Systems, methods and computer program products for facilitating searching, obtaining and displaying product choice recommendations using inputs, including continuum-based inputs, and variable-sized visual representations are disclosed. In an embodiment, a user is presented with at least one continuum-based selector and at least one product choice visual representation. At least one input indicating user interest value in a product attribute is received and compared with stored result values of product choices. A unique weighing value indicating the relevancy of the product choice is generated for each product based on the comparison performed. The user is then presented with at least one product choice visual representation which may be modified based on the unique weighing value of the product choice.

25 Claims, 5 Drawing Sheets

(56) References Cited

U.S. PATENT DOCUMENTS

| | | |
|---|---|---|
| 2008/0052185 A1 | 2/2008 | Goel |
| 2008/0052372 A1 | 2/2008 | Weber |
| 2008/0104045 A1 | 5/2008 | Cohen |
| 2008/0109156 A1 | 5/2008 | Park |
| 2008/0319773 A1 | 12/2008 | Wong |
| 2009/0019031 A1* | 1/2009 | Krovitz et al. .................. 707/5 |
| 2009/0150343 A1 | 6/2009 | English |
| 2009/0157613 A1 | 6/2009 | Strohmenger |
| 2009/0164453 A1* | 6/2009 | Rothman .......................... 707/5 |
| 2009/0171899 A1 | 7/2009 | Chittoor |
| 2010/0037170 A1 | 2/2010 | Poole |
| 2010/0088190 A1 | 4/2010 | Fliess |
| 2010/0198628 A1 | 8/2010 | Rayner |
| 2010/0312464 A1 | 12/2010 | Fitzgerald |
| 2011/0213787 A1 | 9/2011 | Cerny |

OTHER PUBLICATIONS

Zhengping Wu et al., A Fuzzy Decision System Using Shoppers' Preferences for Recommendations in E-Commerce Applications, Nov.-Dec. 2009, Ninth International Conference on Intelligent Systems Design and Applications, pp. 803-808.*

* cited by examiner

CONTINUUM-BASED SELECTION OF PRODUCT CHOICE

CROSS REFERENCE TO RELATED APPLICATION

This application claims priority to pending U.S. Provisional Patent Application No. 61/491,998, titled "Process for Searching, Obtaining and Displaying Personalized Recommendations Using Multi-Positional Inputs and Variable-Sized Images," filed on Jun. 1, 2011, which is hereby incorporated by reference as to its entire contents.

FIELD OF THE DISCLOSURE

The present disclosure relates to identifying and selecting products and more particularly to obtaining and displaying product choices using continuum-based inputs.

BACKGROUND

Despite a glut of accessible information, consumers do not have a quick, easy, and manageable way to obtain and evaluate information about products or services. Satisfactory selection of a product or service frequently requires many hours of research. Users must absorb and sort thousands of available website links, lists, reviews and often redundant or repetitive textual descriptions.

For example, many consumers use the Internet to obtain and evaluate product or service information and to purchase products and services. Consumers seek to readily identify products and/or services that will satisfy the consumer's desires. Ideally, identification of a suitable product or service would be accomplished without repetitive searching; however the binary nature of Boolean search terms is often ill equipped to capture the nuance of a consumer's desire during an initial search, leading to repetitive searching. Additionally, web search engines require users to generate relevant textual search terms, ensure that they are spelled correctly (especially if it is a proper name or more obscure term), type or select those terms from a list, submit a search query and then scan, read and evaluate the best text-based results from a list often containing thousands of options. This process can require significant time investment without guaranteeing that a satisfactory result will be found because the consumer must themselves initially direct the search with an imperfect idea of how to properly, precisely classify desirable products or services.

In some industries, consumers often utilize guides who present choices to the consumer. These initial choices may be based on the consumer's tastes, location, and other relevant factors. An example of a guide is a travel agent who considers a client's vacation destination tastes, budget, and visceral responses to initial questions and criteria presented. The travel agent then applies their knowledge and experience to the consumer's interests and presents the consumer with one or more choices based on the travel agent's analysis of the consumer's interests. This guided selection of a vacation destination may go through several iterations of choices being presented to the consumer before a vacation destination is ultimately selected.

SUMMARY

This Summary is provided to introduce a selection of concepts in a simplified form that are further described below in the Detailed Description. This Summary is not intended to identify key features or essential features of the subject matter to be claimed, nor is it intended to be used to limit the scope of the subject matter to be claimed.

This disclosure addresses the above-described situation by providing methods, computer program products, and systems for facilitating searching, obtaining and displaying product choice recommendations using inputs, including continuum-based inputs, and variable-sized visual representations. Disclosed methods, computer program products, and systems are suitable for displaying product choices from many different industries. More specifically, the present disclosure presents visual representations of product choices to a user. Product choices may be selected from categories including the following exemplary categories: vacation destinations, vacation activities, vacation accommodations, vacation packages, restaurants, music, art, audiovisual entertainment, live entertainment, consumer goods, political candidates, political beliefs, medical treatments, and medical conditions. A product choice is an individual product, service, combination of products and services, user-selectable unit, or consumer-selectable unit within a category or categories. Product choices may be presented or selected in a variety of circumstances including browsing the Internet for a product choice from a computing device, selecting or being presented with a product choice via a smartphone application, selecting or being presented with product choices based on user input received by an advertisement (e.g., where the user indicates an interest level via a slider within a displayed advertisement and the user is directed to a page with relevant product choices).

In some embodiments, the visual representation is modified according to user interest levels. In some embodiments, the visual representation is modified according to other data including user location, consumer ratings, expert reviews, and saved user tastes and selections. User input values are input via a continuum-based selector which comprises pre-selected product choice criteria. The continuum-based selector facilitates receipt and precise identification of user desires in a product (e.g., "royal blue" instead of "blue" or "red", "partly sunny" instead of "rain" or "sun"), compared to binary radio button, check-box, or drop-down menu-based selections of product choice criteria.

In some embodiments, as a result of the present disclosure's systems, computer program products, and methods, the user is presented with a graphical user interface (GUI) comprising at least one continuum-based selector and at least one product choice visual representation. The GUI allows the user to select a product choice or input user interest values utilizing at least one continuum-based selector.

In some embodiments, user interest values are receivable from sources other than the user. User inputs are received from user interaction with at least one continuum-based selector. Each continuum-based selector comprises at least one pre-selected criterion, a cursor capable of being manipulated by the user, and a cursor area wherein the user moves the cursor to indicate his relative interest in the at least one criterion in the continuum-based selector.

Methods, computer program products, and systems of the present disclosure compare one or more user interest values with at least one product choice. The comparison comprises identifying the similarity of user interest value with stored result values located on computer readable media for a given product choice. A unique weighing value is generated for each product choice compared; the unique weighing value is at least partially based on the comparison of user interest value and stored result values previously performed. The unique weighing value corresponds to the relevance of a specific product choice to the user based at least in part on received user interest values. The user is then presented with at least one product choice visual representation. The visual representation presented is modified based on the unique weighing value of the product choice depicted. In some embodiments, this visual representation is scaled in proportion to the unique weighing value of the product choice depicted.

Further features and advantages of the methods, computer program products, and systems disclosed herein, as well as the structure and operation of various aspects of the present disclosure, are described in detail below with reference to the accompanying figures.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

DETAILED DESCRIPTION

Figure 1:
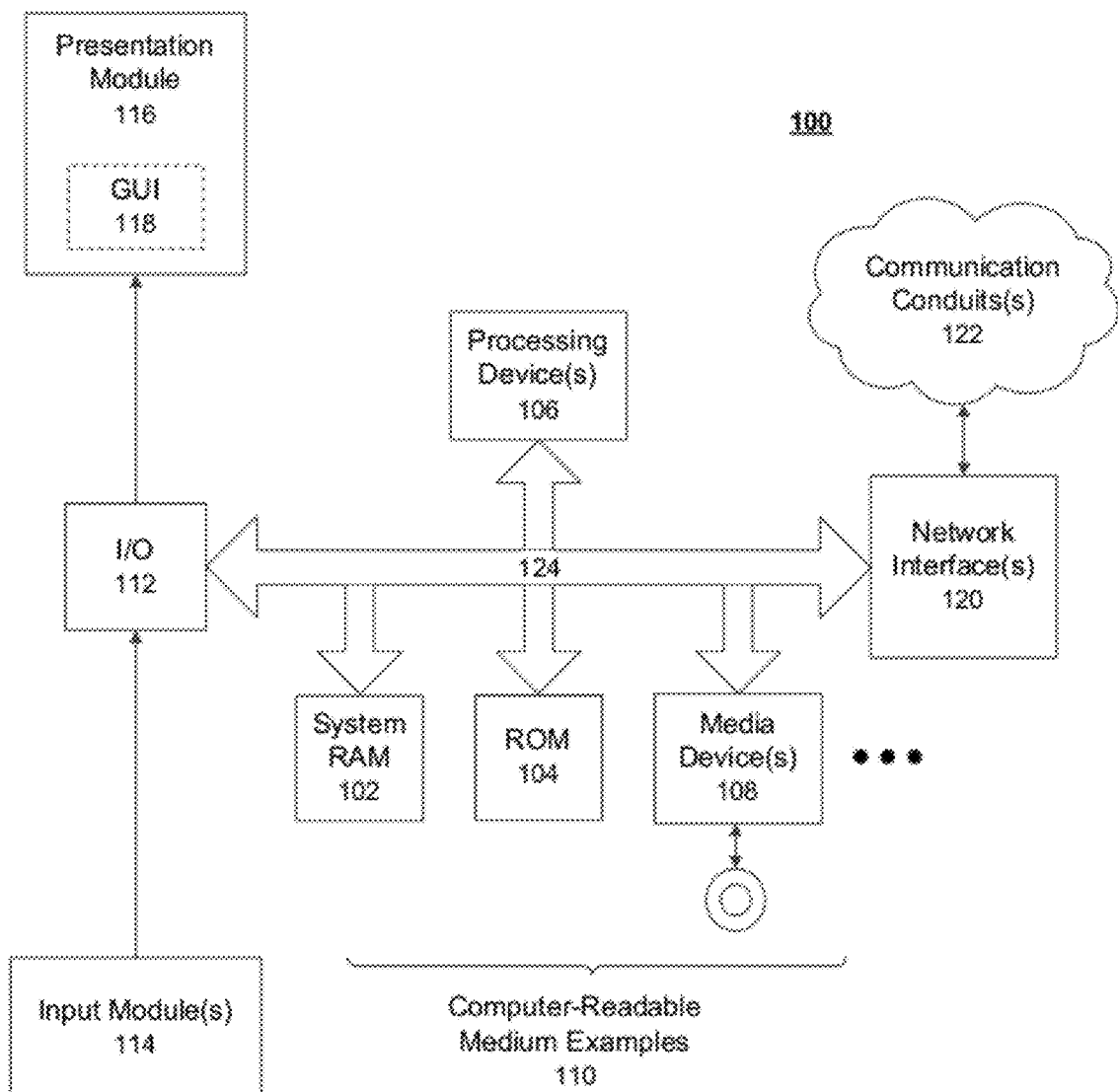
FIG. 1 is a block diagram illustrating an exemplary computer system useful for implementing the present disclosure.
Figure 1:
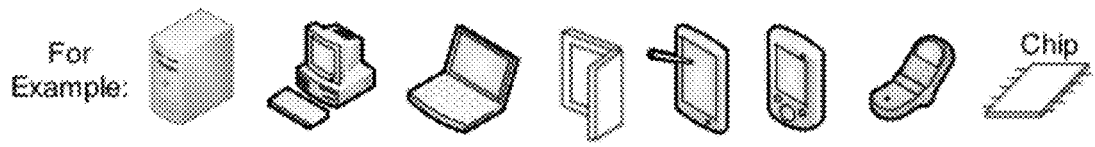

The present disclosure is directed to obtaining and displaying product choice recommendations using continuum-based inputs. As used herein, a "product choice" refers to an individual product, service, combination of products and services, user-selectable unit, or consumer selected unit within a category or categories or a decision on any query facilitated by simultaneous consideration of multiple inputs. Product choices may be selected from categories including the following exemplary categories: vacation destinations, vacation activities, vacation accommodations, vacation packages, music, music playlists, art, audiovisual entertainment, live entertainment, consumer goods, political candidates, political beliefs, medical treatments, and medical conditions.

As will be appreciated by those skilled in the relevant art(s) after reading the description herein, the methods, computer program products, and systems for facilitating searching, obtaining and displaying product choice recommendations using inputs, including continuum-based inputs, and variable-sized visual representations of the present disclosure may be utilized by a service provider. As used herein, a "service provider" refers to an individual, person, business, or automated system who may be providing goods and/or services. The service provider may allow users to access an ecommerce website on a free registration, paid subscriber and/or pay-per-use basis via one or more World-Wide Web (WWW) sites on the Internet.

As will also be appreciated by those skilled in the relevant art(s), in an aspect, various (login, admin, account, information, resource, logout, payment, registration, communications, etc.) screens would be generated by the service provider's WWW site(s) in response to input from users over the Internet. That is, in such an embodiment, the service provider would have a typical Web server running a server application at a Web site which sends out Web pages in response to Hypertext Transfer Protocol (HTTP) or Hypertext Transfer Protocol Secured (HTTPS) requests from remote browsers on various devices being used by various users. Thus, the server would provide a graphical user interface (GUI) to users in the form of Web pages. These Web pages are sent to one or more desktop (PC), laptop, tablet, notebook, mobile device, PDA, smart phone or like computing functionality (devices) 100 utilized by users, and would result in the GUI being displayed.

As will also be appreciated by those skilled in the relevant art(s) after reading the description herein, alternate aspects of the present disclosure may include providing the tool for facilitating searching, obtaining and displaying product choice recommendations using inputs, including continuum-based inputs, and variable-sized visual representations within a stand-alone system (e.g., installed on one server PC) or as an enterprise system wherein all the components are connected and communicate via an inter-corporate wide area network (WAN) or local area network (LAN) rather than as an ecommerce Web service (i.e., application service provider (ASP) model utilized by various, unrelated/unaffiliated users.

Referring now to FIG. 1, a block diagram illustrating an exemplary computer system useful for implementing the present disclosure is shown. FIG. 1 sets forth illustrative computing functionality 100 that may be used to implement any aspect of the functions described herein. For example, computing functionality 100 may be used to implement any aspect of the present disclosure. In all cases, computing functionality 100 represents one or more physical and tangible processing mechanisms.

Computing functionality 100 may include volatile and non-volatile memory, such as RAM 102 and ROM 104, as well as one or more processing devices 106 (e.g., one or more central processing units (CPUs), one or more graphical processing units (GPUs), and the like). Computing functionality 100 also optionally includes various media devices 108, such as a hard disk module, an optical disk module, and so forth. Computing functionality 100 can perform various operations identified above when the processing device(s) 106 executes instructions that are maintained by memory (e.g., RAM 102, ROM 104).

More generally, instructions and other information may be stored on any computer readable medium 110, including, but not limited to, static memory storage devices, magnetic storage devices, and optical storage devices. The term "computer readable medium" also encompasses plural storage devices. In all cases, computer readable medium 110 represents some form of physical and tangible entity. By way of example, and not limitation, computer readable medium 110 may comprise "computer storage media" and "communications media."

"Computer storage media" include volatile and non-volatile, removable and non-removable media implemented in any method or technology for storage of information, such as computer readable instructions, data structures, program modules or other data. Computer storage media include, but are not limited to, RAM 102, ROM 104, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable medium.

Computing functionality 100 also includes an input/output module 112 for receiving various inputs (via input modules 114), and for providing various outputs (via one or more output modules). One particular output mechanism may include a presentation module 116 and an associated GUI 118. Computing functionality 100 may also include one or more network interfaces 120 for exchanging data with other devices via one or more communication conduits 122. One or more communication buses 124 communicatively couple the above-described components together.

Communication conduit(s) 122 may be implemented in any manner (e.g., by a local area network, a wide area network (e.g., the Internet), etc., or any combination thereof). Communication conduit(s) 122 can include any combination of hardwired links, wireless links, routers, gateway functionality, name servers, etc., governed by any protocol or combination of protocols.

Alternatively, or in addition, any of the functions described herein can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The terms "module" and "component" as used herein generally represent software, firmware, hardware, or combinations thereof. In the case of a software implementation, the module or component represents program code that performs specified tasks when executed on a processor. The program code can be stored in one or more computer readable memory devices, as described with reference to FIG. 1 The features of the present disclosure described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming console, and the like).

Figure 2:
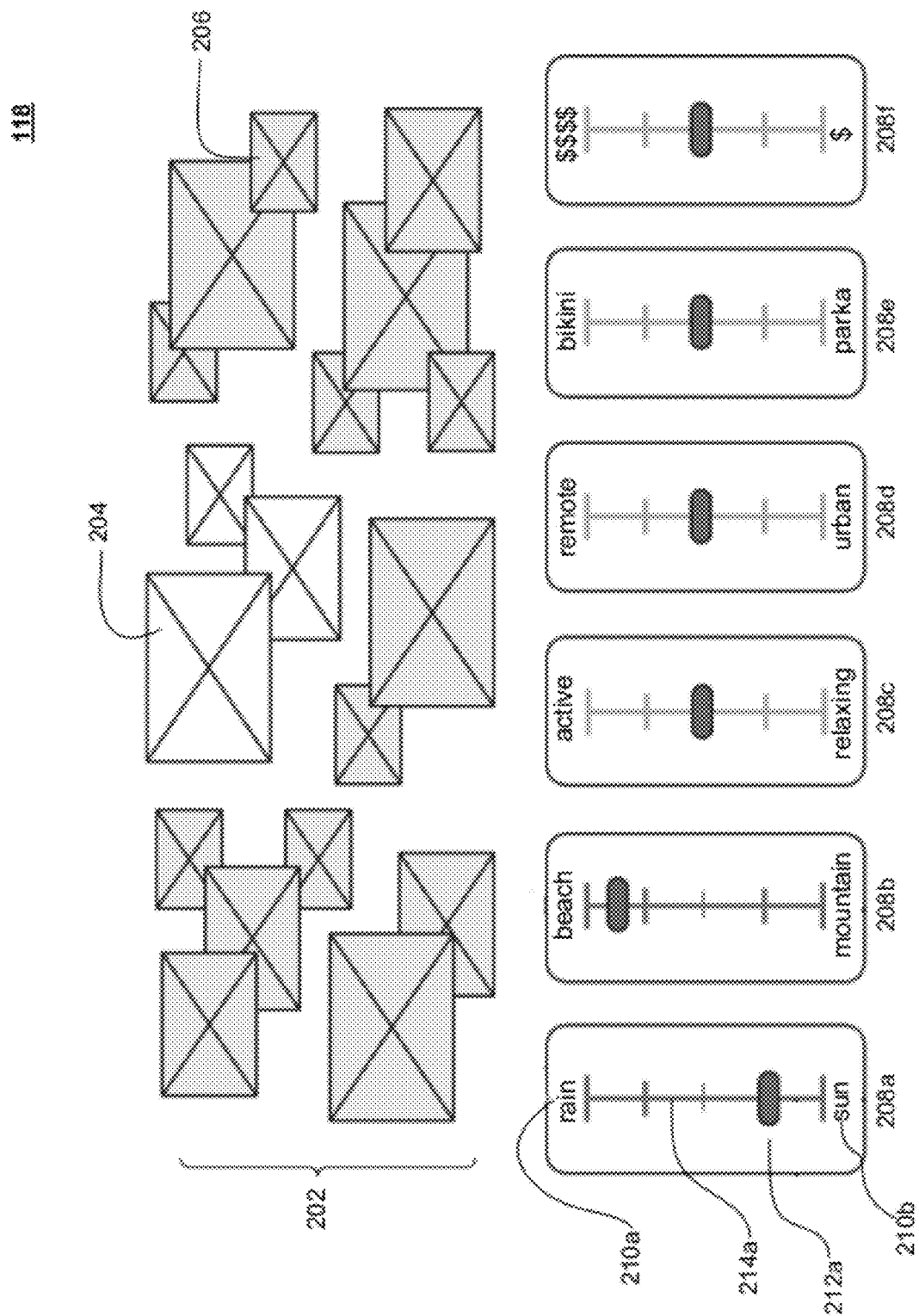
FIG. 2 is an illustration of an exemplary graphical user interface for searching, obtaining and displaying product choice recommendations using inputs including continuum-based inputs and variable-sized visual representations, according to an embodiment of the present disclosure.

Referring now to FIG. 2, an illustration of an exemplary GUI 118 for the searching, obtaining and displaying of product choice recommendations using inputs, including continuum-based inputs, and variable-sized visual representations, according to an embodiment of the present disclosure is shown.

GUI 118 comprises one or more product choice visual representations 202 and one or more continuum-based selectors 208 (shown as selectors 208a-208f in FIG. 2). In an embodiment, GUI 118 is presented to a user by presentation module 116 of computing system 100 (e.g., a desktop, laptop, notebook, tablet computer, personal digital assistant (PDA), mobile telephone, smart telephone, gaming console, etc.). In some embodiments, presentation module 116 also comprises input module 114 (e.g., a mouse, keyboard, touch screen, camera systems configured to detect and accept user input). In other embodiments, input modules 114 are partially distinct from presentation module 116. In such embodiments, input modules 114 may be a keyboard and mouse wherein the user may interact with methods, computer program products, and systems according to the present disclosure by moving a pointer within GUI 118.

In an embodiment, presentation module 116 presents at least one product choice visual representation 202. In an embodiment, more than one product choice visual representation 202 depict the same product choice, but using different visual representations in order to provide the user with more information about the product choice. In other embodiments each product choice visual representation 202 depicts a different product choice, thus maximizing the number of choices presented to the user within GUI 118. In an embodiment, product choice visual representations 202 are scaled according to component calculations of unique weighing value of the product choice depicted. In one embodiment, large scale depiction 204 indicates a high unique weighing value for the product choice depicted. Small scale depiction 206 indicates a lower unique weighing value for the product choice depicted. In some embodiments, a high unique weighing value indicates that the product choice is very relevant to the user, based on received user interest values.

In some embodiments, product choice visual representations 202 are presented to the user via presentation module 116 before the user has interacted with methods, computer program products, and systems according to the present disclosure. In an embodiment, product choice visual representations 202 presented before a user has interacted with computing functionality 100 represent a random selection of product choices. In another embodiment, product choice visual representations 202 presented before a user has interacted with computing functionality 100 represent product choices appealing to the user based on stored user preferences accessed by computing functionality 100. In yet another embodiment, product choice visual representations 202 presented before a user has interacted with computing functionality 100 represent product choices which are relevant to similar users. In yet another embodiment, product choice visual representations 202 presented before a user has interacted with computing functionality 100 represent popular product choices. In yet another embodiment, product choice visual representations 202 presented before a user has interacted with computing functionality 100 represent promotional product choices, seasonally relevant product choices or specially chosen product choice based on known information about the user, such as the user's location, budget, travel destination desire, and past shopping habits.

One or more product choice visual representations 202 are presented, providing the user with product choices and representations of product attributes before the user independently formulates a complete list of product attributes they seek in selecting a product choice. A product attribute is a trait of a product choice. For example, a product choice of a beach vacation to Miami Beach, Fla. has the product attributes of "sun," "beach," "Miami Beach," and so forth. Initially presenting the user with one or more product choice visual representations 202 exposes the user to additional product choices and attributes which the user may not have considered when initially seeking (or searching for) a product choice.

In some embodiments, after the user has interacted with computing functionality 100, a portion of GUI 118 displays one or more product choice visual representations 202 which are unrelated or loosely-related to received user interest values. These product choice visual representations 202 expose the user to additional product choices and attributes which the user may not have considered when initially seeking (or searching for) a product choice and may assist the user in finding the most desirable product choice because being presented with unrelated or loosely-related product choices may prompt the user to reevaluate their criteria 210 selections.

Each continuum-based selector 208 comprises one or more criteria 210 (shown as criteria 210a-210b in FIG. 2), a cursor 212 (shown as cursor 212a in FIG. 2), and a cursor area 214 (shown as cursor area 214a). Although a plurality of criteria 210, cursors 212, and cursor areas 214 are present in FIG. 2, labels for criteria 210, cursors 212, and cursor areas 214 associated with continuum-based selectors 208b-208f have been omitted for the sake of clarity of FIG. 2. Each criteria 210 is an indication of one or more product attributes. In an embodiment, criteria 210 is a word (e.g., "rain," "sun," "beach," "mountain In another embodiment, criteria 210 is a visual signal (e.g., a picture of a mountain, a graphic of a tree). In another embodiment, criteria 210 is an audio-visual clip, such as a video of individuals dancing in a nightclub. In another embodiment, criteria 210 is an audio clip, such as the sound of splashing waves. In yet another embodiment, criteria 210 are only visual representations such as an icon or a graphic. Icon- or graphic-based criteria 210 are capable of being understood by the user regardless of the user's native language.

In yet another embodiment, at least one criteria 210 is a limiting criteria 210. The limiting criteria 210 excludes product choices and other criteria 210 which conflict with the limiting criteria 210. For example, in an embodiment where the user is selecting a television, size is a limiting criteria 210. The user may indicate their desire to select a television which has a viewing diagonal of at least fifty inches. In an embodiment where user is selecting a vacation package, limiting criteria 210 may be the location of the vacation package. For example, user may indicate their desire to select a vacation package within the state of Florida, or within Europe. Cursor 212 is an icon presented in GUI 118, movable by the user (via one or more input modules 114) in order to express user interest in one or more criteria 210. Cursor area 214 is an n-dimensional space wherein cursor 212 is moveable. Cursor 212 is moveable relative to one or more criteria 210 positioned relative to cursor area 214. In one embodiment, continuum-based selector 208 is a slider comprising two criteria 210, a cursor 212, and a cursor area 214. One criterion 210 is positioned on one end portion of a two-dimensional cursor area 214 and one criterion 210 is positioned on the other, opposite end portion of two-dimensional cursor area 214. Cursor 212 is positioned along cursor area 214 and is movable along the axis of cursor area 214, in motion relative to the positions of criteria 210. In an embodiment, continuum-based selector 208 is a tuning knob and cursor area 214 is a circle. Cursor 212 position relative to criteria 210 is determined based on the radial position of cursor 212.

In an embodiment, the user inputs their interest in one or more criteria 210 by moving cursor 212 within cursor area 214 relative to the positions of one or more criteria 210. In one embodiment, a first criteria 210a is positioned on one end portion of a two-dimensional cursor area 214 and a second criteria 210b is positioned on the other, opposite end portion of two-dimensional cursor area 214. First and second criteria 210 are qualitatively distinct (e.g., rain and sun, swimming and hiking, beach and mountain, active and relaxing, quiet and lively, adults only and kid-friendly). In another embodiment, first and second criteria 210 are quantitatively distinct (e.g., $ and $$$$, $100/day and $10,000/day). In some embodiments, nuance of language allows usage of criteria 210 contained in continuum-based selector 208 to be less qualitatively or quantitatively distinct (e.g., sunny and partly cloudy, $200/day and $300/day). In another embodiment, a single criteria 210 is present in multiple continuum-based selectors 208. Cursor 212 in each continuum-based selector 208 is movable relative to single criteria 210 and other criteria 210. In such embodiments, the position of cursor 212 relative to single criteria 210 and other criteria 210 is modifiable by the user via input module 114.

In another embodiment, continuum-based selector 208 is an area wherein cursor 212 is movable in two dimensions and configured as a slider bar. In some embodiments, cursor area 214 is a box. In another embodiment, cursor area 214 is a circle or triangle. In some embodiments, criteria 210 are statically placed relative to cursor area 214. The user moves cursor 212 relative to statically placed criteria 210 in continuum-based selector 208. The relative position of cursor 212 to criteria 210 indicates the user's relative interest level in criteria 210 contained in continuum-based selector 208. In one embodiment, continuum-based selector 208 comprises a triangular cursor area 214 wherein the triangle is an equilateral triangle, three criteria 210 positioned at the corners of triangular cursor area 214, and a cursor 212 located within triangular cursor area 214 and moveable by the user.

In another embodiment, continuum-based selector 208 is a three-dimensional area wherein cursor 212 is movable in three dimensions within continuum-based selector's 208 three-dimensional cursor area 214. In an embodiment, cursor area 214 is a cube. Criteria 210 area statically placed on each side of the cube cursor area 214. Cursor 212 is moveable by the user within the volume of cube cursor area 214. In another embodiment utilizing cube cursor area 214, cursor is moveable by the user along the surface of cube cursor area 214. In other embodiments utilizing three-dimensional cursor area 214, cursor area 214 may be a hexagonal tube, a triangular tube, a sphere, or another polyhedron.

In some embodiments, criteria 210 are not statically placed relative to cursor area 214. In an embodiment where the user indicates a high user interest value in a given criteria 210, the user is presented with additional, more particularized related criteria, enabling the user to "drill down" to criteria 210 which more accurately capture their interests.

In an embodiment, cursor area 214 contains a default state wherein cursor 212 registers no preference between one or more criteria 210 contained within continuum-based selector 208. In the embodiment depicted in FIG. 2, the default state is located at a point on the cursor area 214 equidistant between two criteria 210 contained in continuum-based selector 208 (e.g., criteria 210a-b within selector 208a shown in FIG. 2). In some embodiments, cursor 212 located at the default state registers no user preference between two criteria 210 contained in continuum-based selector 208. In other embodiments, cursor located at the default state indicates an apathy or neutrality toward criteria 210 contained in continuum-based selector 208. In one embodiment, continuum-based selector 208 comprises a triangular cursor area 214 wherein the triangle is an equilateral triangle, three criteria 210 positioned at the corners of triangular cursor area 214, and a cursor 212 located within triangular cursor area 214 and moveable by the user. In such an embodiment, the default state is located at a point equidistant from the vertices of the triangular cursor area 214.

In an embodiment, GUI 118 is initially presented to the user comprising cursors 212 in positions within their respective cursor areas 214 indicating interest in one or more criteria 210. In an embodiment, the initial positions of cursors 212 indicate the relative interest placed in these positions in response to inputs, including stored user preferences, photos, the location of the user, user purchasing habits, and, in the case of travel product choice selection, destination information from a third-party source, hotel, flight, travel package or other travel product inventory. This information is accessible via communication conduits 122 and stored on one or more computer readable medium 110.

In some embodiments, GUI 118 comprises additional elements including links to or text of user reviews and ratings, links to or text of expert reviews and rating, inventory levels, and a user login prompt.

Figure 3:
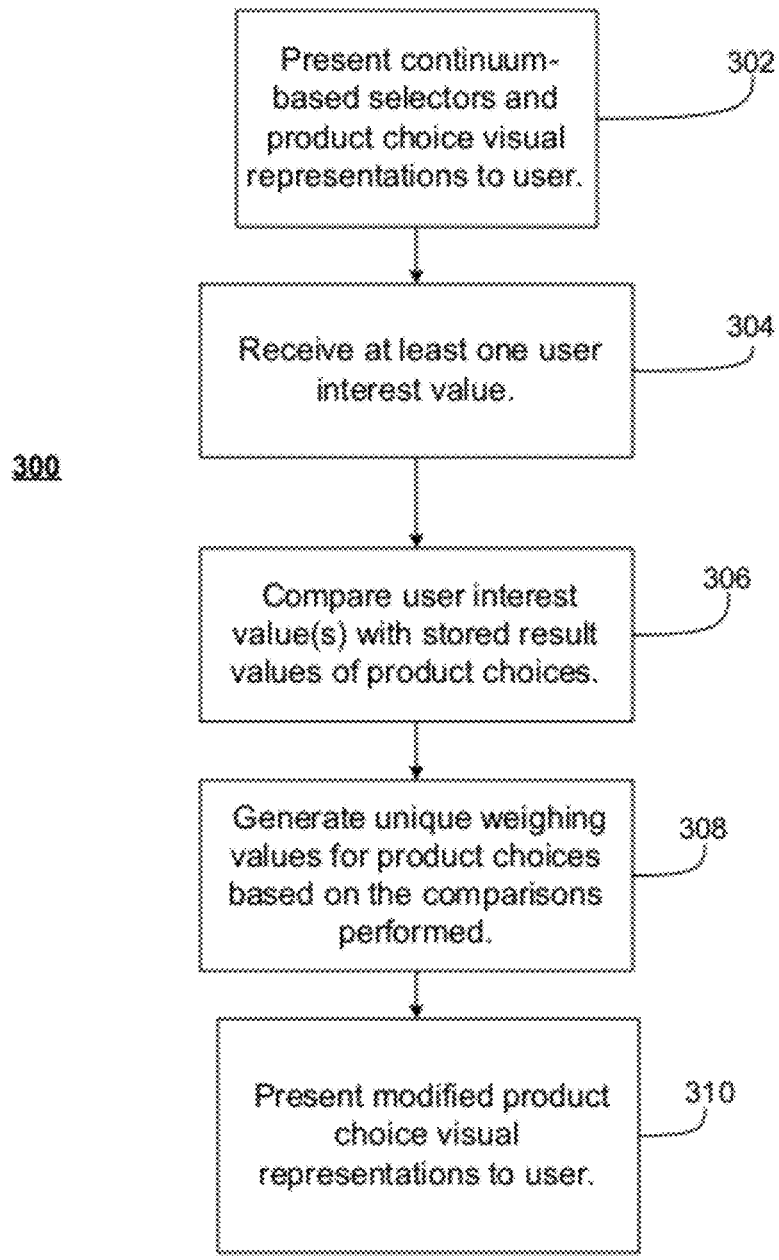
FIG. 3 is a flowchart illustrating an exemplary process for searching, obtaining and displaying product choice recommendations using inputs including continuum-based inputs and variable-sized visual representations according to an embodiment of the present disclosure.

Referring now to FIG. 3, a flowchart illustrating an exemplary process for searching, obtaining and displaying product choice recommendations using inputs, including continuum-based inputs, and variable-sized visual representations according to an embodiment of the present disclosure is shown. In such an embodiment, one or more continuum-based selectors 208 and one or more product choice visual representations 202 are presented in GUI 118 and are configured such that the user can interact with one or more continuum-based selectors 208 or one or more product choice visual representations 202.

In an embodiment, process 300 is implemented utilizing computing functionality 100. Process 300 begins at step 302.

In step 302, a module of a program in accordance with this disclosure utilizes presentation module 116 to present one or more continuum-based selectors 208 and one or more product choice visual representations 202 to a user. In an embodiment, one or more continuum-based selectors 208 and one or more product choice visual representations 202 are presented in GUI 118. In an alternate embodiment, one or more continuum-based selectors 208 and one or more product choice visual representations 202 are presented via a two-dimensional display. In yet another alternate embodiment, one or more continuum-based selectors 208 and one or more product choice visual representations 202 are presented via a three-dimensional display.

In step 304, at least one user interest value is received. The user interest value is an indication of the user's desire to select a product choice with a given attribute. In an embodiment, user interest values are receivable for a single person inputting user interest values via input module 114. In another embodiment, user interest values are received from multiple users, as a group of friends are planning a trip and input user interest values via input modules 114 associated with multiple computing devices. In yet another embodiment, user interest values are received from computer readable media 110. The user interest value is continuum-based. That is, where a user is very interested in a given attribute (e.g., user must go to the beach on their vacation) a high user interest value is provided. Where a user is less interested in a given attribute (e.g., going to the beach while on vacation would be nice, but not essential) a moderate user interest value is provided. Where a user does not want a given attribute (e.g., user does not want to be near a beach) a low or zero user interest value is provided.

In an embodiment, the user inputs one or more user interest values via input module 114 and GUI 118 by moving cursor 212 of continuum-based selector 208. In other embodiments, user interest values are received from on-site or off-site computer readable medium 110 wherein the user interest values provided are pre-defined to reflect the user interest values of a specific type of consumer, like a remote beach seeker, an avid soccer player, a single mother, or a retiree living in Florida. These pre-defined user interest values may be generated by users, programmers, product experts, and travel experts.

In some embodiments, received interest values from on-site or off-site computer readable medium 110 are based on the user's location, such as the user's home city or the location they are inputting user interest values at. For example, where the user is utilizing methods, computer program products, or systems in accordance with the present disclosure to select a vacation destination away from the user's home town, user interest values received from on-site or off-site computer readable medium 110 indicate that the user is located in San Francisco, Calif. and desires to go to another location for their vacation. In some embodiments, a user interest value also indicates San Francisco, Calif. is the flight departure and flight return location. In another embodiment, the user is located in Atlanta, Ga. and desires to have dinner at a local Italian restaurant. Received user interest values indicate the user's desire for Italian cuisine and for a restaurant location in Atlanta, Ga. In another embodiment, the user utilizes methods, computer program products, or systems in accordance with the present disclosure to locate nearby shopping opportunities while the user is walking around New York City's Times Square. Received user interest values include the user's desire for nearby shopping opportunities and the user's location in New York City's Times Square.

In some embodiments, user interest values are received in step 304 from user input via continuum-based selector 208. The user positions cursor 212 on cursor area 214 at a location corresponding with their interest level in criteria 210 included in continuum-based selector 208. Cursor 212 position indicates the user interest level. In step 304, the position of cursor 212 is received by a program module configured to receive user interest values. In some embodiments, the user moves several cursors 212, and more than one user interest value from the user's actions are received.

In some embodiments, user interest values indicating limitations are received. In an embodiment where the user desires a television with a viewable diagonal larger than fifty inches a corresponding user interest value is received which will exclude televisions possession viewing diagonals smaller than fifty inches. Limiting user interest values may also be geographic in nature. In an embodiment where user is selecting a vacation package, the user may indicate their desire to select a vacation package within the state of Florida, or within Europe. In such embodiments, corresponding user interest values will be received which exclude vacation packages outside the state of Florida or Europe. As will be apparent to one skilled in the relevant art(s), limiting user interest values may be any attribute relevant to identify the user's desired product choice In some embodiments, user input values received in step 304 are used to form a profile of the user's tastes or preferences. In some embodiments, criteria 210 contained in continuum-based selectors 208 presented to the user are presented based on information contained in a user's profile. For example, a continuum-based selector 208 which contains the criteria 210 "bikini" and "parka" for users without a profile contains the criteria 210 "5-inch heels" and "flip-flops" for a user with a profile indicating that criteria 210 "5-inch heels" and "flip-flops" will be more relevant selection criteria for that user. Optionally, the user profile is viewable by other users and aids other users in identifying individuals with similar tastes. This knowledge lends credibility to a user's reviews or comments when viewed by others.

In step 306, process 300 compares the user interest levels received in step 304 with product choices. In one embodiment, this comparison is performed by accessing one or more computer readable medium 110 containing stored result values. Stored result values indicate the quantity or quality of an attribute a specific product choice has. For example, a vacation to Miami Beach, Fla. would have high stored result values for attributes such as "sunny weather," "urban night life," and "beach." The vacation to Miami Beach, however, would have low stored result values for such attributes as "rainy weather" and "mountain climbing." In some embodiments, a lookup table for stored result values is accessed and product choices with stored result values that correspond with user interest values for the user interest values supplied are located. In some embodiments, where multiple user interest values have been supplied, multiple stored result values for a product choice are compared to user interest values.

In some embodiments, limiting criteria 210 specify the source of the stored result values used in steps 304-306. In one such embodiment, continuum-based selectors 208 contain limiting criteria 210 indicating sources of stored result values. Via continuum-based selectors 210 the user is capable of indicating a range of sources they desire their product choice recommendations to be based on. Sources of stored result values include, but are not limited to, editorial sources (e.g., travel commentators, product reviewers), crowd-sourced sources, and personal sources (e.g., friends, family, co-workers). Other sources include expert sources and novice sources.

In step 308, process 300 generates unique weigh values for at least one product choice that was compared in step 306. In one embodiment, the unique weighing value of a product choice is generated by dividing the unique interest value supplied by the user for a given product choice attribute by the stored result value for the product choice attribute. When the [user interest value] is equal to the [stored result value], the division operation results in a unique weighing value of 1. Thus, when a 1 is returned, this indicates the product choice would be highly relevant to the user. In other embodiments, multiple user interest values are received and compared in step 304 and step 306. Unique weighing values for a product choice are generated based on the similarity of more than one unique weighing value to its corresponding stored result value and higher unique weighing values are assigned where a product choice possesses multiple stored result values which correlate strongly with user interest values. Other methods for weighing and calculating the relevance of a product choice to received user interest values will be apparent to those skilled in the relevant arts.

In step 310, process 300 presents to the user at least one product choice visual representation 202. The product choice visual representations 202 are modified based on the unique weighing value of the product choice that was generated in step 308. In one embodiment, product choice visual representations 202 are scaled in proportion to their unique weighing values and presented to the user via presentation module 116. The relevance of the product choice is proportional to the unique weighing value of the product choice, with higher unique weighing values indicating that a product choice is more relevant to the user. In an embodiment, large scale depiction 204 indicates a high unique weighing value for the product choice depicted and a small scale depiction 206 indicates a lower unique weighing value for the product choice depicted.

In some embodiments, at least one additional user interest value is received upon completion of step 310. Steps 306-310 may be repeated. Where unique weighing values are generated based on the at least one additional user interest value which differ from previous unique weighing values, the user is presented with product choice visual representations 202 which differ from the initial product choice visual representations 202 presented to the user. New product choice visual representations 202 are scaled differently and represent different product choices, depending on the embodiment.

In some embodiments, received user interest values for a single user are saved in a user preference report. Information saved in the user preference report includes, but is not limited to, the user input values received from an individual users input, the user input values compared with product choices, changes the user makes to user input values, and consistency of user interest values over multiple input sessions. In some embodiments, user preference report is transmitted to computer readable media 110 where it is accessible by the user or a third party. Third parties include, but are not limited to, product choice suppliers, product choice providers, and product choice developers.

In some embodiments, information regarding user interest values is saved in an aggregate preference report. Information saved in the aggregate preference report includes, but is not limited to, the user input values received from all user inputs, user input values compared with product choices, changes users makes to user input values upon being presented with additional product choice visual representations, consistency of user interest values, and any other information a person having ordinary skill in the art would find relevant when analyzing user choices, preferences, and desires. In some embodiments, aggregate preference report is transmitted to computer readable media 110 where it is accessible by the user or a third party. Third parties include, but are not limited to, product choice suppliers, product choice providers, and product choice developers.

Figure 4:
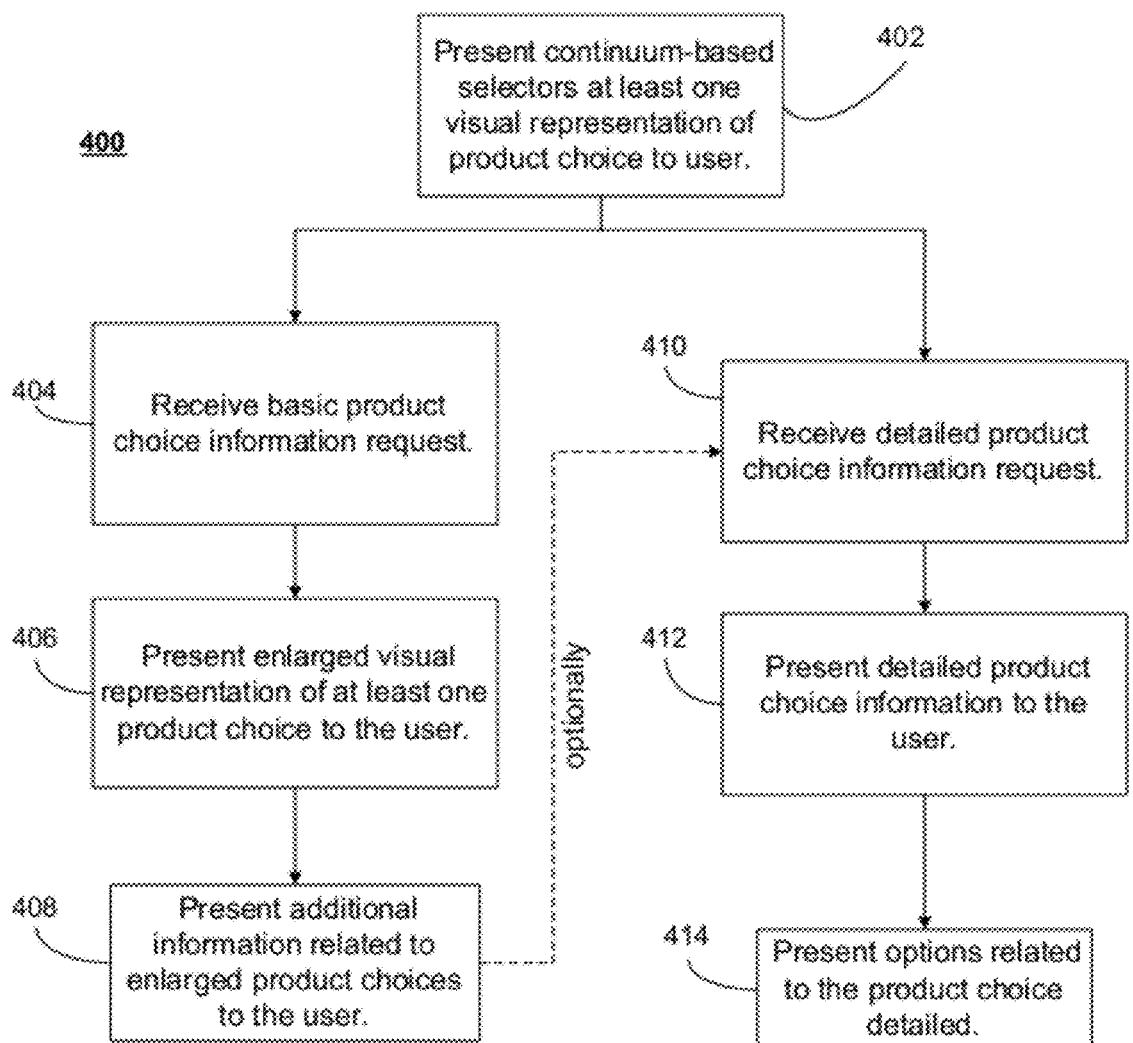
FIG. 4 is a flowchart illustrating an exemplary process for searching, obtaining and displaying product choice recommendations using inputs including continuum-based inputs and variable-sized visual representations wherein additional information about a product choice is presented to the user according to an embodiment of the present disclosure.

Referring now to FIG. 4, a flowchart illustrating an exemplary process for searching, obtaining and displaying product choice recommendations using inputs, including continuum-based inputs, and variable-sized visual representations wherein additional information about a product choice is presented to the user according to an embodiment of the present disclosure is shown.

In step 402, process 400 utilizes presentation module 116 to present one or more continuum-based selectors 208 and one or more product choice visual representations 202 to a user. In an embodiment, one or more continuum-based selectors 208 and one or more product choice visual representations 202 are presented in GUI 118. That is, one or more continuum-based selectors 208 and one or more product choice visual representations 202 are presented via presentation module 116 and are configured such that the user can interact with one or more continuum-based selectors 208 or one or more product choice visual representations 202 via input module 114.

In an alternate embodiment, one or more continuum-based selectors 208 and one or more product choice visual representations 202 are presented via a two-dimensional display. In yet another embodiment, one or more continuum-based selectors 208 and one or more product choice visual representations 202 are presented via a three-dimensional display.

In step 404, the user requests basic product choice information. In an embodiment, basic product choice information is requested when the user places a pointer over a specific product choice visual representation 202. Basic product information includes, but is not limited to, an enlarged product choice visual representation 202, pricing information, additional product choice description, ordering information, ratings, reviews, and inventory levels.

In step 406, presentation module 116 presents the user with at least one enlarged product choice visual representation 202. Then, in step 408, presentation module 116 presents additional information related to the enlarged product choices. Additional information includes, but is not limited to, pricing information, additional product choice description, ordering information, ratings, reviews, and inventory levels.

In some embodiments, the user moves a pointer to a product choice visual representation 202 wherein the product choice visual representation 202 is an image. The image of the product choice is scaled, for example, to 150% of its previous size and text is displayed below the image providing the user with a textual description of the product choice.

In step 410, process 400 receives a request for detailed product choice information. In some embodiments, a request for detailed product choice information is received when the user utilizes input module 114 and selects a product choice by clicking on a specific product choice visual representation 202. Other means of receiving a request for detailed product choice information will be apparent to those skilled in the relevant art(s).

In alternate embodiments, the user may request detailed product choice information such that step 410 occurs after step 408 (as shown in FIG. 4). In yet another embodiment, however, step 410 may occur after step 402. Detailed product information includes, but is not limited to, purchasing information, pricing information, additional product choice description, ordering information, ratings, reviews, and inventory levels.

After receiving detailed product choice information request in step 410, presentation module 116 presents the user with detailed product information on a separate page, window, or section in step 412.

In step 414, presentation module 116 provides the user with one or more options including, but not limited to, purchasing the product choice, saving information about the product choice to the user's account or computer, sending/sharing information about the product choice, creating a review of the product choice, creating a rating of the product choice, or comparing the product choice with at least one other product choice. Sending information about the product choice includes sending an email message containing information about a specified product choice to a designated email address, sending a message via some third-party software, sending a text (SMS) message, or sending a message via a social networking site such as FACEBOOK® (available from Facebook, Inc. of Menlo Park, Calif.), PINTEREST® (available from Cold Brew Labs, Inc. of Palo Alto, Calif.), or LINKEDIN® (available from LinkedIn Corporation of Mountain View, Calif.).

Figure 5:
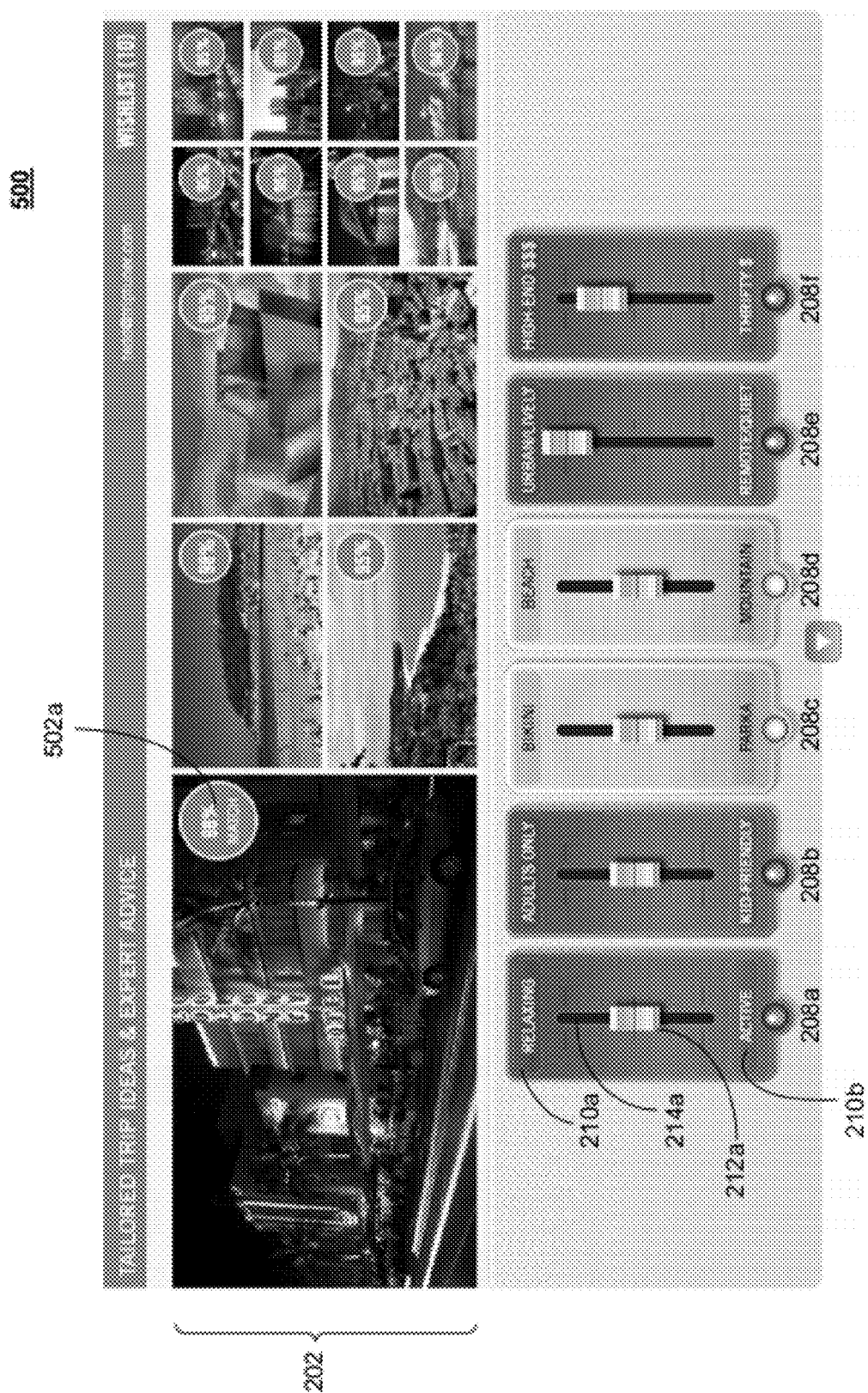
FIG. 5 is a screenshot illustrating an exemplary graphical user interface for searching, obtaining and displaying product choice recommendations using inputs including continuum-based inputs and variable-sized visual representations, according to an embodiment of the present disclosure.

Referring now to FIG. 5, a screenshot illustrating an exemplary graphical user interface 500 for searching, obtaining and displaying product choice recommendations using inputs, including continuum-based inputs, and variable-sized visual representations, according to various embodiments of the present disclosure is shown.

As explained above, process 300 is capable of presenting a unique weighing value of a product choice to the user. Thus, in an embodiment, a visual representation of value 502 is a text display of percentage match. In another embodiment, visual representation of value 502 is a rating between zero and five stars. In another embodiment, visual representation of value 502 is a graphic icon indicating the product choice's relevance to the user. In another embodiment, visual representation of value 502 is a bounding box enclosing product choice visual representations 202 with similar unique weighing values. In yet another embodiment, visual representation of value 502 is a graphical overlay indicating the product choice's relevance to the user. For example, a graph indicates stored values associated with a product choice and another graph indicates received user interest values. Where visual representation of value 502 is a graphical overlay indicating the product choice's relevance to the user, the graph indicating stored values associated with a product choice and the graph indicating received user interest values are overlaid. Where the graphs completely overlap, the associated product choice is highly relevant. Where the graphs partially overlap or do not overlap, the associated product choice is less relevant or not relevant to the user.

In some embodiments, one or more visual representations of value 502 indicating the unique weighing value of various product choice visual representations 202 may be presented. In one such embodiment, presentation module 116 presents one or more visual representations of value 502 to the user contemporaneously with or after step 310 of process 300. In alternate embodiments where user input values have previously been stored, presentation module 116 may present one or more visual representations of value 502 to the user contemporaneously with or after step 302 of process 300.

In some embodiments, product choice visual representations 202 are presented to the user wherein the product choice visual representation 202 additionally comprises previous choice information. Previous choice information is a visual representation of the unique weighing value associated with the product choice depicted which was generated based on previous received user interest values. In an embodiment where a user has utilized methods, computer program products, and systems in accordance with this disclosure in the past (e.g., visiting the same travel website to choose a vacation destination once in the past), unique weighing values associated with product choices are stored. Product choice visual representations 202 associated with stored unique weighing values are presented to the user additionally comprising previous product information. For example, a user has previously visited a travel website searching for a beach vacation. In the previous visit, a high unique weighing value for a trip to Waikiki was calculated and stored. The user returns to the travel website to search for a vacation. Upon arrival, or after additional inputs are received, the user is presented with a picture of a Waikiki beach vacation and a graphic stating "You previously gave Waikiki five stars!"

In an embodiment, product choice visual representations 202 are presented to the user in sequence. In some embodiments, the sequence is in descending order of relevance. In another embodiment, product choice visual representations 202 are presented to the user via presentation module 116 presented to the user sequentially. One product choice visual representation 202 may appear at a time. In some embodiments, the most relevant product choices with the highest unique weighing values are presented to the user first. In an embodiment, comprising sequential presentation of product choice visual representations 202, a first presentation of a product choice is initiated and at least one additional product choice is presented after the first presentation has begun. In some embodiments, product choice visual representations 202 are presented in a manner that fills a single display area upon conclusion of presenting all product choice visual representations 202 to be presented to the user. In other embodiments, product choices are presented in a slide show fashion and may be ordered according to unique weighing value.

In some embodiments, product choice visual representations 202 overlap. In other embodiments, such as one in accordance with GUI 500, product choice visual representations 202 are presented in a grid arrangement. In some embodiments, a single set of product choice visual representations 202 are presented via GUI 118 unless an input is received. In other embodiments, multiple sets of product choice visual representations 202 are presented via GUI 118 in the absence of an input. Presentation of multiple sets of product choice visual representations 202 presents a user with more product choices and/or more perspectives on the same product choice than a static presentation of product choices would present. In some embodiments, product choice visual representations 202 are displayed in column or row format in order of descending unique weighing value. In some embodiments, product choice visual representations 202 are presented to the user according to their distance from the user.

In some embodiments, the display format of GUI 118 is adjustable by the user. In an embodiment, the user may input the maximum number of product choice visual representations 202 to be displayed. In another embodiment, the user may select the type of product choice visual representation 202 to be used to show product choices, including but not limited to image, textual list, and map-based views.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A computer-implemented method that facilitates searching, obtaining and displaying product choice recommendations using inputs, including continuum-based inputs, and relevance-indicating visual representations, the method comprising the steps of:
   (a) presenting a continuum-based selector to a user and at least one product choice visual representation, the continuum-based selector being based on a continuum between a plurality of attribute criteria, the plurality of attribute criteria including first attribute criteria and second attribute criteria, and
   the continuum-based selector providing a relative preference adjustment between the first attribute criteria and the second attribute criteria;
   (b) receiving at least one input indicating at least one user interest value, the at least one input representing a relative preference between the plurality of attribute criteria, and the receiving at least one input being performed by the user interfacing with the continuum-based selector;
   (c) comparing the at least one user interest value with a stored result value for at least one product choice, the comparing at least partially based on similarity of at least one user interest value and a stored result value for at least one product choice;
   performing the comparing utilizing a ratio relationship, the ratio relationship quantifying correlation between the at least one user interest value and the stored result value;
   (d) generating a unique weighing value for at least one product choice compared, wherein the generation of the unique weighing value is at least partially based on the ratio relationship; and
   (e) presenting at least one product choice visual representation to the user wherein the product choice visual representation is modified based on the unique weighing value of the product choice depicted in the product choice visual representation.

2. The method of claim 1, further comprising steps of:
   (f) presenting at least one further continuum-based selector to a user, the at least one further continuum-based selector being based on a continuum between further attribute criteria;
   (g) receiving at least one additional input indicating at least one user interest value, and the receiving at least one additional input being performed via the user interfacing with the at least one further continuum-based selector; and
   (h) performing steps (c) through (e) wherein received user interest values include the at least one additional input received in step (g).

3. The method of claim 1, further comprising the steps of:
   (f) receiving an input from the user requesting basic product choice information;

(g) presenting to the user an enlarged product choice visual representation; and (h) presenting to the user additional information related to product choices which have been enlarged.

4. The method of claim 1, further comprising the steps of:

(f) receiving an input from the user requesting detailed product choice information;

(g) presenting information related to product choices to the user; and (h) providing the user one or more options chosen from the group consisting of purchasing the product choice, saving information about the product choice, sending information about the product choice, reading reviews of the product choice, reading ratings of the product choice, creating a review of the product choice, creating a rating of the product choice, or comparing the product choice with at least one other product choice.

5. The method of claim 1, further comprising the step of:

(f) presenting at least one visual representation of a value indicating the unique weighing value of a product choice to the user.

6. The method of claim 1, wherein modification of the product choice visual representation is scaling the size of the product choice visual representation in proportion to the unique weighing value of the product choice.

7. The method of claim 1, wherein the continuum-based selector is a user adjustable visual representation of a slider bar.

8. The method of claim 1, wherein product choice visual representations are presented to the user by initiating a first presentation of a product choice and presenting at least one additional product choice after the first presentation has begun.

9. The method of claim 1, wherein each of the plurality of attribute criteria are related to different product attributes.

10. The method of claim 1, wherein the plurality of attribute criteria are not mutually exclusive of one another.

11. The method of claim 1, wherein:

the first attribute criteria is constituted by a beach attribute; and the second attribute criteria is constituted by a mountain attribute.

12. The method of claim 1, the ratio relationship constituted by performing a division operation that includes dividing the at least one user interest value by the stored result value to generate a quotient, and such that the quotient approaching a value of 1 indicates increasing similarity between the user interest value vis-à-vis the stored result value.

13. A computer readable storage medium that stores computer readable instructions, the computer readable instructions facilitating searching, obtaining and displaying product choice recommendations using inputs, including continuum-based inputs, and relevance-indicating visual representations when executed by one or more processing devices, the computer readable storage medium constituted by non-transitory machine-readable medium, the computer readable instructions comprising:

logic configured to present a continuum-based selector to a user and at least one product choice visual representation, the continuum-based selector being based on a continuum between a plurality of attribute criteria, the plurality of attribute criteria including first attribute criteria and second attribute criteria, and the continuum-based selector providing a relative preference adjustment between the first attribute criteria and the second attribute criteria;

logic configured to receive at least one input indicating at least one user interest value, the at least one input comprising a relative preference between the plurality of attribute criteria, and the logic configured to receive the at least one input by the user interfacing with the continuum-based selector;

logic configured to compare user interest values with at least one product choice, such comparison at least partially based on similarity of user interest value and stored result values for at least one product choice; performing the compare utilizing a ratio relationship, the ratio relationship quantifying the similarity of the user interest value and the stored result values;

logic configured to generate unique weighing values for each product choice compared, wherein the generation of unique weighing values is at least partially based on the ratio relationship; and logic configured to present at least one product choice visual representation to the user wherein the product choice visual representation is modified based on the unique weighing value of the product choice depicted in the product choice visual representation.

14. The computer readable storage medium of claim 13, further comprising:

logic configured to present at least one further continuum-based selector to a user, the at least one further continuum-based selector being based on a continuum between further attribute criteria;

logic configured to receive at least one additional input indicating at least one user interest value, and such logic configured to receive at least one additional input being performed by the user interfacing with the at least one further continuum-based selector; and logic configured to compare additional user interest values with at least one product choice, the comparison at least partially based on similarity of additional user interest values and stored result values for at least one product choice.

15. The computer readable storage medium of claim 13, further comprising:

logic configured to receive an input from the user requesting basic product choice information;

logic configured to present to the user an enlarged product choice visual representation; and logic configured to present to the user additional information related to product choices which have been enlarged.

16. The computer readable storage medium of claim 13, further comprising:

logic configured to receive an input from the user requesting detailed product choice information;

logic configured to present information related to product choices to the user; and logic configured to provide to the user options to select the product choice, save information about the product choice, send information about the product choice, or compare the product choice with at least one other product choice.

17. The computer readable storage medium of claim 13, further comprising:

logic configured to present at least one visual representation of a value indicating the unique weighing value of a product choice to the user.

18. The computer readable storage medium of claim 13, wherein modification of the product choice visual representation is scaling the size of the product choice visual representation in proportion to the unique weighing value of the product choice.

19. The computer readable storage medium of claim 13, wherein the continuum-based selector is a user adjustable visual representation of a slider bar.

20. The computer readable storage medium of claim 13, wherein product choice visual representations are presented to the user by initiating a first presentation of a product choice and presenting at least one additional product choice after the first presentation has begun.

21. A computer system that facilitates searching, obtaining and displaying product choice recommendations using inputs, including continuum-based inputs, and relevance-indicating visual representations, the computer system comprising:
one or more processing devices that perform processing including:
(a) presenting at least one continuum-based selector to a user and at least one product choice visual representation, the at least one continuum-based selector being based on a continuum between a plurality of attribute criteria, the plurality of attribute criteria including first attribute criteria and second attribute criteria, and
the continuum-based selector providing a relative preference adjustment between the first attribute criteria and the second attribute criteria;
(b) receiving at least one input indicating at least one user interest value, the at least one input comprising a relative preference between the plurality of attribute criteria, and
the receiving at least one input being performed by the user interfacing with the continuum-based selector;
(c) comparing the at least one user interest value with at least one product choice, the comparing at least partially based on similarity of user interest value and stored result values for at least one product choice;
performing the comparing utilizing a ratio relationship, the ratio relationship quantifying the similarity of the user interest value and the stored result values;
(d) generating unique weighing values for each product choice compared, wherein the generation of unique weighing values is at least partially based on the ratio relationship ; and
(e) presenting at least one product choice visual representation to the user, wherein the product choice visual representation is modified based on the unique weighing value of the product choice depicted in the product choice visual representation.

22. The computer system of claim 21, the one or more processing devices perform further processing including:
(f) presenting at least one further continuum-based selector to a user, the at least one further continuum-based selector being based on a continuum between further attribute criteria;
(g) receiving at least one additional input indicating at least one user interest value, and the receiving at least one additional input being performed via the user interfacing with the at least one further continuum-based selector; and
(h) performing steps (c) through (e) wherein received interest values include the additional inputs received from the user in step (f).

23. The computer system of claim 21, the one or more processing devices perform further processing including:
(f) receiving an input from the user requesting basic product choice information;
(g) presenting to the user an enlarged product choice visual representation; and
(h) presenting to the user additional information related to product choices which have been enlarged.

24. The computer system of claim 21, the one or more processing devices perform further processing including:
(f) presenting at least one visual representation of a value indicating the unique weighing value of a product choice to the user.

25. A computer-implemented method that facilitates searching, obtaining and displaying product choice recommendations using inputs, including continuum-based inputs, and relevance-indicating visual representations, the method comprising the steps of:
(a) presenting a continuum-based selector to a user and at least one product choice visual representation, the continuum-based selector being based on a continuum between a plurality of attribute criteria, the plurality of attribute criteria including first attribute criteria, second attribute criteria, and third attribute criteria, and
the continuum-based selector providing a relative preference adjustment between the first attribute criteria, the second attribute criteria, and third attribute criteria;
(b) receiving at least one input indicating at least one user interest value, the at least one input representing a relative preference between the plurality of attribute criteria, and the receiving at least one input being performed by the user interfacing with the continuum-based selector through manipulation of a cursor;
(c) comparing the at least one user interest value with a stored result value for at least one product choice, the comparing at least partially based on correlation between user interest value and a stored result value for at least one product choice;
(d) generating at least one unique weighing value for at least one product choice compared, wherein the generation of at least one unique weighing value is at least partially based on the comparison performed; and
(e) presenting at least one product choice visual representation to the user wherein the product choice visual representation is modified based on at least one unique weighing value of the product choice depicted in the product choice visual representation; and
the continuum-based selector comprises a shaped area with each of the first attribute criteria, the second attribute criteria, and the third attribute criteria represented by respective specific locations of the shaped area, and
the cursor disposed relative to the shaped area and moveable by the user; and
a position of the cursor vis-à-vis the specific locations of the shaped area representing the relative preference between the plurality of attribute criteria, the cursor constituting the at least one input; and
the shaped area is constituted by a triangular cursor area with each of the first attribute criteria, the second attribute criteria, and the third attribute criteria respectively represented by a corner of the triangular cursor area, and
the cursor located within the triangular cursor area and movable by the user; and
a default state, for the cursor, is located at a point equidistant from the corners of the triangular cursor area.

* * * * *